United States Patent [19]

Leopoldi

[11] 4,206,978
[45] Jun. 10, 1980

[54] LIGHT REFLECTING MAGNIFIER

[76] Inventor: Norbert Leopoldi, 4180 Marine Dr., Chicago, Ill. 60613

[21] Appl. No.: 7,506

[22] Filed: Jan. 29, 1979

[51] Int. Cl.² .......................... G02B 7/02; G02B 25/02
[52] U.S. Cl. ...................................... 350/252; 350/242
[58] Field of Search ................................ 350/235–257, 350/69, 61–67, 319; 403/202, 331, 332, 335, 361

[56] References Cited

U.S. PATENT DOCUMENTS

| | | | |
|---|---|---|---|
| 1,095,285 | 5/1914 | Oliver | 350/78 |
| 2,202,679 | 5/1940 | Woodin | 403/202 |
| 3,488,103 | 1/1970 | Webb | 3 50/65 |
| 3,551,021 | 12/1970 | Straat | 350/69 |
| 4,099,851 | 7/1978 | Rethore | 350/237 |

FOREIGN PATENT DOCUMENTS

| | | | |
|---|---|---|---|
| 25483 | 1/1884 | Fed. Rep. of Germany | 350/319 |
| 463778 | 4/1937 | United Kingdom | 350/235 |

*Primary Examiner*—John K. Corbin
*Assistant Examiner*—Wm. H. Punter
*Attorney, Agent, or Firm*—McWilliams, Mann & Zummer

[57] ABSTRACT

This invention relates to a light reflecting magnifier primarily for reading and which consists of a magnifying lense mounted in a frame which spaces the lense in properly focused relation to a reading surface and which is circular and having a circular interior reflective wall that tapers from a maximum diameter adjacent the underside of the lense to a smaller diameter opening at the bottom of the mounting frame.

2 Claims, 4 Drawing Figures

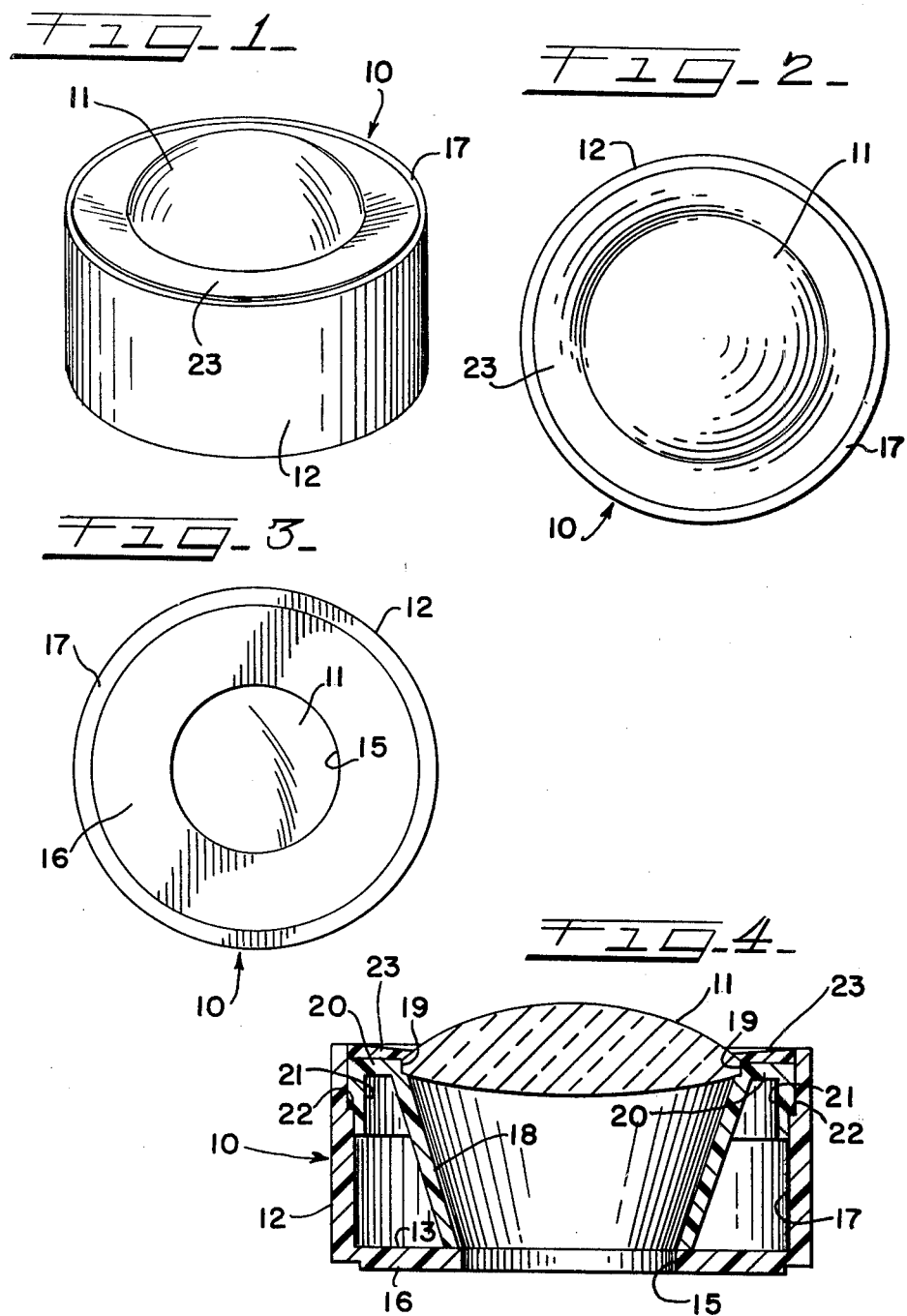

LIGHT REFLECTING MAGNIFIER

BACKGROUND OF THE INVENTION

Reading glasses, or magnifiers, have been available in the past which have been both of the hand held type and of a kind that is supported on a reading surface over the material to be read. The latter type has included lenses mounted for use in spaced relation to a reading surface and some where a magnifying lense lies directly on the reading material for magnifying a line or two at a time. These lenses were largely elongated so as to extend over the width of the page being read, but others were of a shorter length for shifting along as the material was read. Where such lenses were spaced above the reading material, it usually was by means of some simple supporting frame, more or less in the nature of generally vertical legs of a length to provide the desired spacing above the material.

The supporting structure for such lenses was open entirely around the lense and the surface and there was no provision for directing such light onto the reading material. Similarly, the reading area was subjected to shadows which also entered this area from any open side of the lense support depending upon where the cause of the shadow was located.

SUMMARY OF THE INVENTION

The present invention provides a reading lense that incorporates an effective means to reflect and direct light onto the reading surface immediately beneath the lense, comprising light that comes through the lense to strike a sloped, or converging surface, that reflects the light onto the reading material. The lense comprises a magnifying lense and which, as disclosed, is mounted in a circular holder that includes a circular outer wall that encloses the structure housing and supporting the lense. An inner circular wall slopes downwardly from the perimeter of the lense and converges to an opening in a bottom wall through which the reading material is viewed. The bottom wall may be integral with the enclosing side wall and includes a bearing surface extending over a major portion of the bottom area and upon which the magnifier normally rests. The circular inner wall supports the lense and is provided with an annular recess, or rabbet, in which the lense is received and a bezel overlies the lense around the perimeter thereof to secure the lense in the supporting structure. The inner circular wall has a horizontal flange defining a top wall which extends radially outward and terminates in a depending annular flange that fits closely within the confines of the circular outer wall. The bezel lies on this horizontal top wall and also fits within the surrounding outer wall.

OBJECTS OF THE INVENTION

The primary purpose of the invention is to provide a reading glass of integral construction having a magnifying lense spaced above a reading surface in proper focus.

The principal object of the invention is the provision of an enclosed support for a magnifying lense having a light reflecting surface surrounding the area beneath the lense.

An important object of the invention is to provide an enclosed magnifying reading lense having a light reflecting surface around the area beneath the lense which converges downwardly from the approximate dimension of the lense to a bottom opening defining the reading area.

Another object of the invention is the provision of a magnifying reading lense mounted in an enclosed support that includes an outer wall and an inner wall around the lense with top and bottom walls connecting the inner and outer walls and wherein the inner wall includes downwardly converging surfaces extending between the lense and an opening in the bottom wall defining the reading area.

DESCRIPTION OF THE DRAWINGS

The foregoing and other and more specific objects of the invention are attained by the construction and arrangement of the reading glass magnifier illustrated in the accompanying drawings wherein FIG. 1 is a general perspective view of a reading glass magnifier constructed in accordance with the teachings of this invention.

FIG. 2 is a top plan view of the magnifier looking down on the reading lense;

FIG. 3 is a bottom view of the magnifier showing the bottom opening defining a reading area; and FIG. 4 is a cross sectional view through the structure of the magnifier lense and supporting enclosure.

DESCRIPTION OF PREFERRED EMBODIMENT

In the drawings 10 represents a magnifying reading glass having a lense 11 mounted therein which, as shown, is made of glass, ground and polished to provide the degree of magnification required, but if preferred, could be made from a suitable plastic material, such as a chrystal clear acrylic which could be molded to provide the contours affording the magnification required and polished to a high degree of perfection.

The magnifier 10 includes a mounting enclosure 12 for the lense which includes three essential parts for supporting and enclosing the lense in a manner whereby all of the light reaching a reading surface passes through the lense and is directed onto a reflecting surface which reflects the light through a bottom opening in the enclosure onto the reading material.

The mounting 12 includes a bottom wall 13 (see FIG. 4) having a central opening 15 therein, surrounded by a bottom supporting surface or bearing pad 16 which is disposed over a major portion of the area of the lower side of the bottom wall 13. A vertical outer wall 17 extends upwardly from the bottom wall 13 and defines the full height of the magnifier assembly.

An inner wall 18 is spaced equally on all sides from the outer wall and converges downwardly from the maximum dimension of the lense 11 at its top to the bottom wall 13 where its inner surface is disposed substantially flush with the surface defined by the opening 15 through the bottom wall. The wall 18 is provided with a rabbet 19 into which the edges of the lense 11 are closely fitted. A horizontal flange, or top wall 20, extends outwardly from the sloping wall 18 at its top and closes the space between the edges of the lense 11 and the outer wall 17. This horizontal wall 20 has an outer depending flange 21 extending downwardly in close engagement with the inner surface of the outer wall 17 and this inner surface and the outside face of the depending flange 21 are both formed with a complemental shoulder 22 whereby the outer wall 17 is adapted to function to support the outside perimeter of the top wall 20 entirely around the magnifier assembly.

The outside edges of the lense 11 are supported on the inner wall 18 in the rabbet 19 so that the lense is mounted a fixed distance above a plane represented by the bottom supporting surface 16 on the underside of the magnifier and this distance has been determined in accordance with the focal length of the lense so that the reading material on the reading surface will be in proper focus as magnified by the lense. The lense 11 is secured in place in the rabbet 19 by means of a bezel 23 overlying the edge of the lense entirely around its perimeter. The bezel 23 beyond the edge of the lense 11 is coincident with the area of the top wall 20 and fits within the outer wall 17 in close engagement with the inner surface thereof. The entire assembly of the magnifier comprising the mounting 12, including the inner member 18, the bezel 23 and the lense 11, are all secured in permanent relationship so that the magnifier is to all intents and purposes a single unit that is conveniently handled as such and which may be placed on reading material for magnification thereof and moved about readily to read all portions of the material. The mounting, comprised of the bottom wall 13 and outer wall 12, the inner wall 18 with the top wall 20 and depending flange 21 and the bezel 23, preferably are made from a suitable plastic material and in the form disclosed is made from a light colored plastic, preferably white, for the greatest reflective qualities.

The magnifier not only is convenient for use in reading but it will be seen that all of the light rays reaching the reading surface must pass through the lense 11 inasmuch as the entire area around the lense beneath the lower face of the lense is fully enclosed by the structure of the mounting 12. Thus, no light can enter beneath the lense from any side of the magnifier but light rays passing through the lense 11 will strike the inner sloping surface of the converging wall 18 and be reflected onto the reading surface through the bottom wall opening 15 whereby the reading material will be brightly lighted.

The magnifier mounting has been referred to herein as being round, or circular, but the invention can be realized in mountings of other shape. For instance, the mounting and the lense might be made in a square form, or it might be elongated in a rectangular form with the lense similarly shaped so that the magnifier in this shape might be quite readily adaptable to placement over the lines of reading material to be examined and read line by line. Acrylic lenses for magnifiers constructed in these forms would be most suitable and in the greater sizes thus involved would be desirable also from the standpoint of maintaining the weight of the unit at a minimum.

From the foregoing it will be seen that a magnifier for reading purposes has been provided wherein the area beneath the level of a lense has been enclosed on all sides to exclude the entry of light so that all light reaching the reading material must pass through the lense and wherein a converging inner wall surface reflects light from the lense through an opening in a bottom wall onto the reading material and thereby afford a bright image for viewing.

What is claimed:

1. A light reflecting reading magnifier including an enclosed mounting, a magnifying lense supported in the mounting in spaced relation to a reading surface, a sloping inside reflecting surface converging downwardly from the perimeter of the lense to said reading surface, said mounting including an outer vertical wall and said inside surface comprises an inner wall in spaced relation to the outer wall, a bottom wall associated with said outer wall, a top wall in association with said inner wall disposed in vertically spaced relation to the bottom wall, an opening in the bottom wall aligned with the bottom end of said inner wall, said top wall fits within the inside dimensions of said outer wall and terminates in a depending flange enclosed within the outer wall, a bezel overlying said top wall and confining the edges of said lense, a bearing pad on the underside of said bottom wall surrounding said opening, said top wall has an outer depending flange fitting within the inside diameter of the outer wall, and opposing shoulders on the depending flange and outer wall complementally engaged.

2. A unitary light reflecting reading magnifier as set forth in claim 1 wherein said mounting is made from a plastic material having a high reflective quality.

* * * * *